Nov. 1, 1966  R. G. SPAIN  3,282,533

RIGIDIZABLE EXPANDABLE STRUCTURES AND SYSTEM

Filed Aug. 7, 1962

INVENTOR.
RAYMOND G. SPAIN
BY Wade Koontz
ATTORNEY

United States Patent Office 3,282,533
Patented Nov. 1, 1966

1

3,282,533
RIGIDIZABLE EXPANDABLE STRUCTURES
AND SYSTEM
Raymond G. Spain, 2000 Stayman Drive, Dayton, Ohio
Filed Aug. 7, 1962, Ser. No. 215,470
6 Claims. (Cl. 244—1)

The invention that is described herein may be manufactured and used by or for the Government for governmental purposes without the payment to me of any royalty thereon.

This invention relates to rigidizable expandable structures, particularly to initially flexible or foldable closures and to a system for the expansion and subsequent rigidification thereof. More particularly, this invention concerns itself with such closures and systems which can advantageously utilize the environment of outer space and are therefore particularly adaptable for use in connection with manned or un-manned orbital or space vehicles.

Because of the severe weight and space penalties currently associated with earth-launched space vehicles, it has been found desirable to use for such vehicles inflatable members which can be carried from the earth's atmosphere in a folded, compact condition, thereafter to be inflated following separation in space from the rocket or other launch vehicle. At the same time, in order to preserve the dimensional stability of the space ship, even after the inflating gas has been lost as by permeation of the wall or through openings that might be created therein by collision with meteoroids or other space debris, it is desired that, once the spaceship has undertaken its journey, it should be rigid.

The prior art has taught a variety of post-launch vehicle inflation systems employing sundry inflation means, some of which include the utilization of a vaporescent material such as a volatile liquid which, upon unrestricted exposure to the ambient vacuum conditions of space, will create an internal vapor pressure capable of expanding the inflatable member. In those few instances where the prior art has sought to gain rigidity or some self-supporting characteristics subsequent to the inflation, there has resulted only nominal rigidity such as might preserve the dimensional stability of the unit against the minimal forces of light, other radiant energy present in space, collision with minute cosmic particles and the like. In no instance however, has this nominal rigidity been sufficient to withstand any significant force such as might be encountered upon the re-entry of the space vehicle into the earth's atmosphere, the impact with the vehicle of subsequently launched vehicles for rendezvous in outer space or the accommodation of human activity in or upon the vehicle. Moreover, the prior art expedients have generally involved modifications of or components in addition to the vehicle proper which have exceeded the presently controlling weight and space limitations and have introduced complications of actuation or operation which have diminished the reliability of performance.

It is accordingly an object of the present invention to provide a rigidizable expandable structure of the type which might be used as a vehicle for travel in outer space.

It is a further object of this invention to provide a system for the expansion and rigidification of such a vehicle which does not depend upon any substantial increases in weight or dimensional complications in the package.

Still another object of the present invention is to provide an initially flexible and foldable closure, the subsequent expansion and rigidification of which may take place substantially simultaneously in response to the influence of a single component.

It is yet another object of the present invention to provide such a structure, the rigidity of which is capable of withstanding forces such as are commonly associated with

2 the accommodation, maintenance and protection of human life, even in a terrestrial environment.

To achieve these and other objects and advantages which will appear from a reading of the following disclosure, the within invention teaches a construction and arrangement of parts wherein both the inflation and rigidification may be accomplished by the same means; viz., a vaporescent rigidifying agent contained within the closure, even while it is in its folded and compacted condition which, upon exposure to a pressure differential between the interior and exterior thereof, as upon exposure to the ambient vacuum of space, will create a sufficient pressure to expand and inflate the closure and will, at the same time upon contact with the walls thereof, result in a rigidification of the walls in situ as for example, by the polymerization of a polymerizable material forming or integrally associated with the closure wall. The selection of materials as taught herein is such that polymerization imparts a structural rigidity to the inflatable member independently of the maintenance of any vapor pressure therewithin.

The invention thus generally described may be more clearly understood by reference to the following descriptions of certain preferred embodiments thereof in connection with which reference may be had to the appended drawings.

Figure 1:
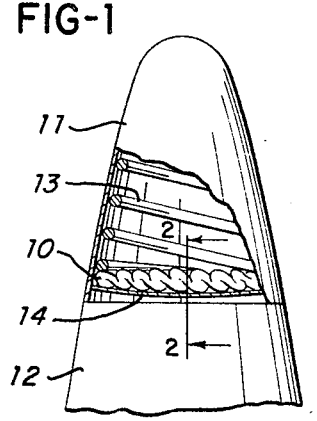
FIGURE 1 is a fragmentary elevational view, partially broken away, of a launch vehicle including a nose cone housing a space vehicle of the type considered by the present invention.

Referring now to FIGURE 1, a structure such as a space vehicle contemplated by the present invention and designated generally by the number 10 is in a compacted and folded condition within the nose cone or forward housing 11 of a conventional space launching unit wherein the nose cone 11 is associated with and thrust into space by a rocket engine or booster 12. At the present state of the art it is the conventional practice to provide the space launching assembly with some means such as the coil spring 13 which is actuable by a timing or pressure device (not shown) to cause a separation of the cone 11 from the booster 12 once the assembly has left the earth's atmosphere or has achieved some other stage in its desired space flight whereupon the vehicle 10 will be separated from both the cone 11 and the booster 12 as upon the spring-actuated release of the cover plate 14 and be immediately thereupon ejected into the ambient vacuum conditions of outer space.

Figure 2:
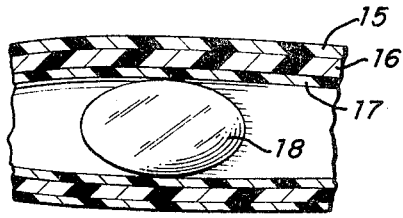
FIGURE 2 is an enlarged fragmentary cross-section taken on the line 2—2 of the space vehicle of FIGURE 1 showing the vaporescent material therein.

The space vehicle in its folded condition is shown in greater detail in FIGURE 2 wherein the closure wall means is shown to be of a multi-ply laminate comprising an outer skin or outermost surface layer 15, an inner reactive or polymerizable layer 16 forming an intermediate layer of the laminate and an innermost layer 17 forming a barrier layer. This wall, the respective laminae of which will be described in greater detail, is continuous to form a closure or hollow construction within which, at some stage during its fabrication or through a suitable opening (not shown) thereafter is inserted a pellet or pressure rupturable container 18 of a vaporescent material. The amount of the vaporescent material will of course depend upon the nature of the materials employed and the size of the closure; but generally it may be said to be sufficiently small that it will not interfere with the normal folding and compacting of the flexible closure member to the condition shown in FIGURE 1.

Coming then to a more detailed description of the laminated wall construction, the outermost layer 15 is preferably of a flexible material of low permeability that is substantially impervious to the passage therethrough of the vapor or gas to be supplied by the pellet or container 18. This layer of course will form the outer skin of the space vehicle or structure, and a wide variety of its properties will be determined by the ultimate use to which the vehicle is to be put. For example where the vehicle is to be a reflective earth satellite, the outer skin may comprise a metal-containing or metal-coated elastomeric vulcanizate such as Viton B which is a hydrofluorocarbon polymer which may be applied to a reinforcing fibrous substrate. The trademark "Viton B" is registered by the E. I. du Pont de Nemours and Co., Inc., as applied to their commercially marketed synthetic rubber, which is a high temperature elastomer comprised of fluorine, carbon, and hydrogen in the approximate ratio of 42:19:1. The intermediate layer 16 may then be composed of a semi-liquid or flexible-solid polymerizable material or pre-polymer which is flexible in the unpolymerized state in which it is incorporated into the wall but rigid in its polymerized state; i.e., after it has been exposed to the influence of the vaporescent material in the manner hereinafter described. Included within the class of materials found suitable for use in this intermediate layer 16 are the polyurethanes, the polyesters, the epoxys, and some low volatility monomers such as alpha cyanosorbic acid esters and the like. The innermost layer or barrier 17 is composed of a flexible material which is permeable to the passage of the gas or vapor from 18 but is non-tacky or non-adhesive to prevent adhesion of the intermediate layer when the various portions thereof might otherwise be in contact with each other, as when the closure is folded. In one preferred embodiment of this invention, the innermost layer 17 may be merely a coating of silicone which is here shown as a layer rather than a surface coating for clarity of illustration.

Figure 3:
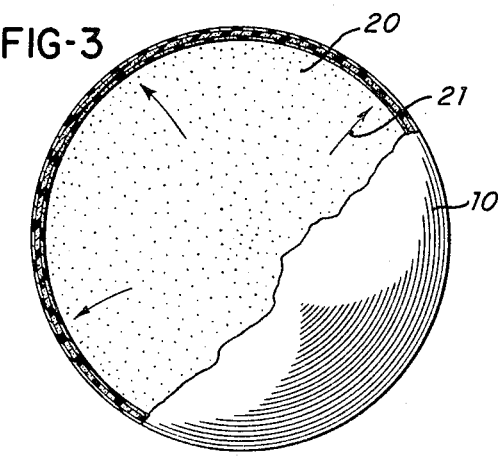
FIGURE 3 is a perspective view, partially broken away and in partial cross-section of the space vehicle of FIGURES 1 and 2 immediately after its inflation.

FIGURES 1 and 2 show the condition of the closure and the vaporescent material while the same are on the ground or exposed to the pressures of the earth's atmosphere. As the booster carries the nose cone package into outer space, the space vehicle and the pellet therein still retain the condition at which they existed in the earth's atmosphere because the nose cone is hermetically sealed. Upon separation of the nose cone 11 from the booster 12 however, and the ejection of the space vehicle 10 into the space environment, the pressure surrounding the closure is substantially eliminated whereupon the material 18 will immediately vaporize and create a sufficient vapor pressure within the closure 10 to inflate it or to expand it radially outwardly against substantially no resisting pressure. As shown in FIGURE 3, the vapor fills the closure in the manner of gases; and the effect of the pressure has been found to be such that the gas will pass through the permeable innermost layer 17 and into the reactive polymerizable layer 16 as illustrated by the small dots 20. The radially outwardly acting force of the gas is illustrated by the arrows 21.

Where the vaporescent material 18 is such that, upon its exposure to the material 16, the latter will become polymerized as by cross-linking, molecular chain extension or the like, the contact between the vapor and the polymerizable material will, dependent only upon the proper selection of the materials in the first instance, result in the desired rigidification. Where the outermost layer 15 is of a material which prevents the passage of the gas therethrough, the vapor will of course be contained within the closure for a substantial period of time until the vehicle should be pierced by collision with meteoroids or the like. In such instances, the reaction time between the gas and the polymerizable material may take place at a slower rate than if the outer impervious layer is not present.

Figure 4:
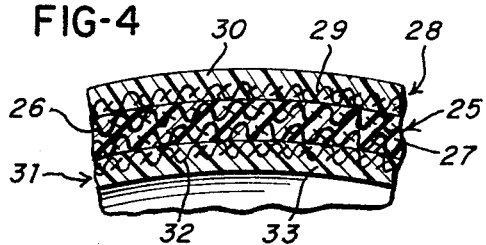
FIGURE 4 is a fragmentary view in partial cross-section showing the construction of a closure wall according to one preferred embodiment of this invention.
Figure 5:
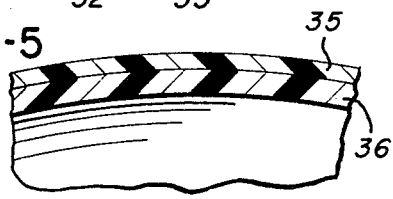
FIGURE 5 is a fragmentary view in partial cross-section showing the construction of a closure wall according to another preferred embodiment of the present invention.

To insure that the polymerizable material will be at its proper location relative to the other components of the vehicle at and until the time it is activated and thereby capable of preserving its own position and further to insure that the desired thickness of the ultimately rigid material will be achieved it has been found desirable in some applications to employ the polymerizable material in its pre-polymer state as an impregnate in a woven fabric or cloth. So also the innermost and outermost layers of the laminated wall may be reinforced with a fabric or fibrous material. As shown in FIGURE 4, the polymerizable layer 25 may consist of one or more layers of a fabric 26 impregnated with the polymerizable material 27. The outermost layer 28 may then also be composed of a fabric layer 29 which is impregnated and/or coated with a plastic material 30. The innermost layer 31 may similarly comprise a fabric 32 which is also impregnated and/or coated with a plastic material 33.

Where the polymerizable material of the reactive layer to be rigidified according to the teachings of this invention is itself non-adhesive of where the proposed original configuration, during launch for example, is such that no parts of the reactive layer will be in contact with other parts thereof, the adhesive barrier may of course be omitted as shown in FIGURE 5. In this figure, the outermost, impervious layer 35 corresponding to the outermost layers 15 and 28 of FIGURES 2 and 4 respectively is the only layer used in association with the polymerizable layer 36.

The above described and illustrated embodiments of this invention have the following characteristics in common. First, all of the wall layers are of a material that is flexible in the condition in which they are originally employed to accommodate the folding and compacting necessary to meet the dimensional restrictions placed upon the package. The outermost layers 15, 28 and 35, in addition to providing whatever skin or surface characteristics may be desired in the final vehicle are also impervious to the passage of gas or the expanding vapor emanating from the pellet such as 18 in FIGURE 2. This imperviousness however need not be complete, particularly where the reaction time between the polymerizing vapor and the polymerizable material is short. Indeed, it has been found that where, for example, a closely woven fabric such as 26 of FIGURE 4 is impregnated with a prepolymer of relatively low viscosity and a quick-acting catalyst from the source 18 is used in combination therewith, the inherent cohesion of the polymerizable layer itself might be sufficient to cause a full expansion of the vehicle upon vaporization of the catalyst which, in thereafter passing on through the polymerizable layer, will cause it to become rigidified. In such instances, the outer skin layer such as 28 in FIGURE 4 may be entirely eliminated, and such surface characteristics as are desired may be associated directly with the polymerizable layer 25. So also, the innermost layer such as 31 of FIGURE 4 may be omitted as stated above.

In the foregoing embodiments, inner barriers 17 and 31 have been regarded as composed only of a non-tacky substance to allow for the free and unrestricted unfolding of the closure as it tends to be expanded by the gas therewithin. It has been found however that the innermost layer may be composed of such a material that it will lend an important function to the ultimate rigidification of the vehicle. It has been discovered that, where the innermost layer comprises a silicone rubber vulcanizate and the vaporescent material employed to trigger the polymerization reaction is triethylamine, not only will the silicone rubber prevent the sticking of the polymerizable layer to itself and allow the free flow of the gaseous catalyst therethrough but its absorption of the triethylamine will result in the exposure of the polymerizable material to a higher concentration of the catalyst as a result of which its rate of rigidification will be higher than that obtainable without any barrier or with any inner barrier of another otherwise suitable material, e.g., a polyethylene film.

The polymerizable layer should be composed of a material that, upon exposure to a suitably chosen catalytic agent, will become rigid at such a rate and to such a degree as is required to meet the previously discussed time limitations and structural requirements. The choice of this material will then determine what vaporescent material 18 is to be employed. Where the polymerizable material forming any of the layers 16, 25 or 36 is a polyurethane for example, the inflating and polymerizing agent 18 may be any of the various amines such as ethylene diamine or piperazine, the dithoil, such as hexamethylene dithiol or water, which at least at the time of its insertion into the interior of the closure, may be in the form of an ice cube. Where the polymerizable material selected is a polyester on the other hand, the catalyst may be a peroxide such as hydrogen peroxide; and where the polymerizable material is an epoxy resin, the vaporescent material may be any of the amines mentioned above, or an acid anhydride such as acetic anhydride.

In one specific construction according to the wall illustrated in FIGURE 4, the outermost layer 28 was composed of a Dacron or polyester fabric 29 coated on one side with an elastomeric vulcanizate of Viton B 30. The trademark "Dacron" is registered by the E. I. du Pont de Nemours and Co., Inc., and is applied to a variety of commercially available products made of polyethylene terephthalate. As the intermediate polymerizable layer 25, two plys 26 of 181 glass cloth (each weighing 8.9 ounces per yard) were applied to the outer layer 28 on the side thereof not previously coated with the Viton B vulcanizate. This laminated assembly was then impregnated with Epon 815 which is an epoxy resin 27 manufactured by the Shell Chemical Company and is described as the reaction product of epichlorohydrin and bisphenol A, together with a minor portion of a reactive diluent (butyl glycidyl ether). An innermost barrier layer 31 of a nylon fabric 32 coated with a silicone rubber vulcanizate 33 was then applied to and pressed against the inner surface of the intermediate layer 25.

For the purposes of comparison another construction the same as that described above was prepared except that the inner layer 31 was omitted. Both wall constructions were then exposed to a triethylamine gas in a concentration of approximately 70 millimeters Hg of the triethylamine to about 690 millimeters Hg of air. After forty-eight hours of this exposure at 77° Fahrenheit both walls were found to be rigid. The wall with the inner barrier 31 was found to have a flexural strength of 29,100 pounds per square inch and a modulus of elasticity of 705,000 pounds per square inch, whereas the wall without the inner barrier 31 had a flexural strength of 17,500 pounds per square inch and a modulus of elasticity of 402,000 pounds per square inch.

Heretofore in this application, the reaction between the expanding or inflating gas and the polymerizable material, insofar as the rigidification of the latter is concerned, has been treated as taking place directly; i.e., the expanding gas was pre-selected in the first instance so that its contact with the polymerizable material would directly result in the polymerization and rigidification thereof. It has been found however that in some instances an equally satisfactory and in certain applications more convenient construction and result can be achieved if the catalyst or polymerizing agent is incorporated at the outset directly in the polymerizable material where it is maintained in an inactive state until the proper time with regard to the inflation of the vehicle. In this instance, the expanding gas from the vaporescent material, rather than acting directly as a catalyst upon permeation of the polymerizable material activates or triggers the catalyst that is already incorporated therein.

Figure 6:
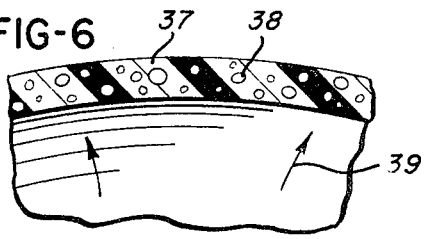
FIGURE 6 is a fragmentary view in partial cross-section showing still another modification of a closure wall according to the present invention wherein a catalyst is incorporated therein.

Such an arrangement is illustrated in FIGURE 6 wherein the wall of the closure is shown to comprise one layer only which is of the polymerizable material 37 distributed throughout which is the polymerizing agent. In this particular modification the polymerizing agent or catalyst is shown to be in the form of tiny globules or capsules 38. In a specific example, the polymerizable material 37 is an epoxy resin and the catalytic gobules 38 are composed of one of the above enumerated amines. The amine globules are encapsulated or totally enclosed within small water soluble shells. The inflating medium corresponding to 18 in FIGURE 2 is a small amount of water or ice, which, upon exposure to ambient vacuum conditions vaporizes to inflate the space vehicle under the influence of forces represented by the arrows 39.

After the water vapor has expanded the structure, it then continues to pass through the polymerizable material 37 whereupon it contacts and dissolves the shells encapsulating the catalytic material 38 which then causes the polymerization. In this one-lamina wall construction, the polymerizable material should of course be selected in the first instance so that sufficient rigidification thereof will take place during the time that the activating water vapor passes through and beyond the closure wall.

Where the source 18 of the vaporescent material is a solid such as ice, it may be inserted into the closure simply in pellet form. On the other hand, where this material is a liquid or is otherwise fugitive or where, as is most often the case, it is desired to confine the vaporescent material to protect against its premature exposure to the other components, it is preferable that the vaporescent material be encapsulated as shown at 18 in FIGURE 2, for example in a balloon-like pressure rupturable container of an elastomeric film such as a rubber film of low tear resistance so that, upon the exposure of the assembly to a vacuum condition, the container will burst and allow the diffusion of the vapor therefrom.

While the invention has been here described in connection with certain preferred embodiments hereof, it is to be understood that the foregoing particularization and detail have been for the purposes of illustration only and do not limit the scope of the invention as it is defined in the subjoined claims.

I claim:

1. A foldable, expandable, rigidizable structure comprising wall means for defining a hollow construction having a predetermined shape, said wall means including a multi-ply laminate in which there is an inner polymerizable layer of resin that becomes rigid upon contact with a predetermined vapor.

2. The structure defined in claim 1 wherein said multi-ply laminate has three flexible layers comprising an outermost layer that is substantially impermeable to the passage therethrough of said predetermined vapor, an innermost layer that is permeable to the passage therethrough of said predetermined vapor, and an intermediate layer formed by said inner polymerizable layer of resin, said intermediate layer being composed of a tacky substance, said innermost layer forming a barrier against contact between inner tacky portions of said intermediate layer when said structure is folded.

3. The structure defined in claim 1, further including a pressure rupturable container positioned within said structure for confining said predetermined vapor under pressure, said vapor being an agent both for expanding and for rigidifying said structure upon bursting of said frangible container.

4. The structure defined in claim 1 wherein said inner polymerizable layer of resin comprises a fabric that is impregnated with an epoxy resin that is polymerizable by a predetermined vapor containing an epoxy resin reactive gaseous amine.

5. The structure defined in claim 1 wherein said inner polymerizable layer of resin comprises a fabric that is impregnated with a polyurethane that is polymerizable by a predetermined vapor containing water.

6. The structure defined in claim 1 wherein said inner polymerizable layer of resin comprises a fabric that is impregnated with a substance that is polymerizable by a predetermined vapor of triethylamine, said laminate having an innermost layer comprising a silicone rubber vulcanizate that is both permeable to the passage therethrough and absorptive of said vapor of triethylamine.

References Cited by the Examiner

UNITED STATES PATENTS

| | | |
|---|---|---|
| 2,996,212 | 8/1961 | O'Sullivan. |
| 3,059,253 | 10/1962 | Sager _____ 9—8 |
| 3,109,607 | 11/1963 | Lally. |

OTHER REFERENCES

Surface Effects on Materials in Space, by Clauss, Aerospace Engineering, October 1960, pp. 16 to 19, 56, 58, 59, 62.

ALEXANDER WYMAN, *Primary Examiner.*

EARL M. BERGERT, JACOB H. STEINBERG, L. T. PIRKEY, *Examiners.*